United States Patent
Oesterling et al.

(10) Patent No.: US 9,918,208 B2
(45) Date of Patent: Mar. 13, 2018

(54) CONTROLLING VEHICLE TELEMATICS UNIT DATA TRANSMISSION BASED ON CALL CENTER LOCATION

(75) Inventors: Christopher L. Oesterling, Troy, MI (US); Richard F. Heines, Ortonville, MI (US)

(73) Assignee: General Motors LLC, Detroit, MI (US)

( * ) Notice: Subject to any disclaimer, the term of this patent is extended or adjusted under 35 U.S.C. 154(b) by 1555 days.

(21) Appl. No.: 12/164,494

(22) Filed: Jun. 30, 2008

(65) Prior Publication Data

US 2009/0325596 A1 Dec. 31, 2009

(51) Int. Cl.
*H04W 4/00* (2009.01)
*H04W 4/20* (2018.01)

(52) U.S. Cl.
CPC ..................................... *H04W 4/20* (2013.01)

(58) Field of Classification Search
CPC ....................................................... H04W 4/20
USPC .... 340/569.2, 569.1, 456.1–457, 404.2, 427, 340/422.1, 428, 415, 466; 455/426.1–426.23, 539.1–539.2; 701/201, 701/207, 213, 117, 119, 118; 709/217, 709/203
See application file for complete search history.

(56) References Cited

U.S. PATENT DOCUMENTS

2003/0084119 A1* 5/2003 Ichimura ........................ 709/217
2005/0096020 A1* 5/2005 Oesterling et al. ......... 455/414.2

* cited by examiner

*Primary Examiner* — Keith Fang
(74) *Attorney, Agent, or Firm* — David Willoughby; Reising Ethington P.C.

(57) ABSTRACT

A method and system that inhibits transmission of location information by a telematics unit outside of a geographic region in which such transmission is prohibited. The method includes identifying the relative location of the vehicle and a call center to which the information is to be sent. If the vehicle is in a country or other geographic region that prohibits transmission of vehicle location data outside of the region and, if the call center is determined by the vehicle to be outside of that region, then the telematics unit inhibits the location data from being sent in any communication between the vehicle and call center.

1 Claim, 2 Drawing Sheets

CONTROLLING VEHICLE TELEMATICS UNIT DATA TRANSMISSION BASED ON CALL CENTER LOCATION

TECHNICAL FIELD

The present invention relates generally to wireless transmission of data from vehicle telematics unit and, more particularly, to the transmission of vehicle location to call centers.

BACKGROUND OF THE INVENTION

As makers of automobiles find new ways to reduce costs in the manufacturing thereof, globalization has been incorporated into the mindset. By globalizing or communizing the platforms upon which vehicles are made, costs in design and inventory are greatly reduced. Therefore, original equipment manufacturers of vehicles are striving to maximize the savings in the design, development and manufacture of vehicles by making as many of the parts of a vehicle common throughout the world.

One problem associated with globalization is that it is quite possible that a vehicle will be transported and used in a region of the world that has laws that are different than those of other regions. And while the use of certain technologies is perfectly acceptable in one geographic region, the use of that technology in another geographic region may violate the laws or regulations of that region. In one such example, a telematics unit of a vehicle has the capability of identifying its geographic location with a great deal of certainty. The geographic location is at times transmitted to a call center to facilitate the driver of the vehicle in any one of a number of ways. In certain regions of the world, it is, however, illegal to transmit the geographic location of a vehicle to a call center outside of the county in which the vehicle is being operated. Therefore, there is a need to design a telematics unit that is capable of identifying and determining whether geographic location information is allowed to be transmitted to a call center or whether that information must be inhibited from being transmitted to a call center.

SUMMARY OF THE INVENTION

According to an aspect of the invention, there is provided a method for inhibiting transmission of location information by a telematics unit of a vehicle to a call center outside a geographic region. The method includes identifying vehicle location, determining the geographic region in which the vehicle is located, determining if the call center is within that same geographic region, and inhibiting the transmission of vehicle location information to the call center if the call center is determined to be outside the geographic region. Preferably, a check is made to determine whether transmission of the vehicle location information to outside the geographic region is prohibited so that transmission of location information is only inhibited for those regions having such restrictions.

According to another aspect of the invention there is provided a telematics unit for a vehicle that includes a cellular chipset for transmission of data about the vehicle to a call center. The telematics unit includes a memory device that is operatively connected to the cellular chipset for storing automatic number information. The telematics unit also includes a processing device operatively connected to the chipset. The processing device compares a telephone number of the call center with the automatic number information of the telematics unit. The processing device inhibits the transmission of the vehicle location information to the call center when a difference between the automatic number information of the vehicle and the telephone number of the call center satisfies a predefined condition.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below allows a single telematics unit to be deployed in a vehicle platform regardless of its eventual location of operation. The method is capable of identifying its location, and based on the information relating to the call center to which it is to communicate, prevent the transmission of certain data that may be prohibited from being transmitted due to the laws and regulations of the region, country, province, state and the like.

Communications System—

Figure 1:
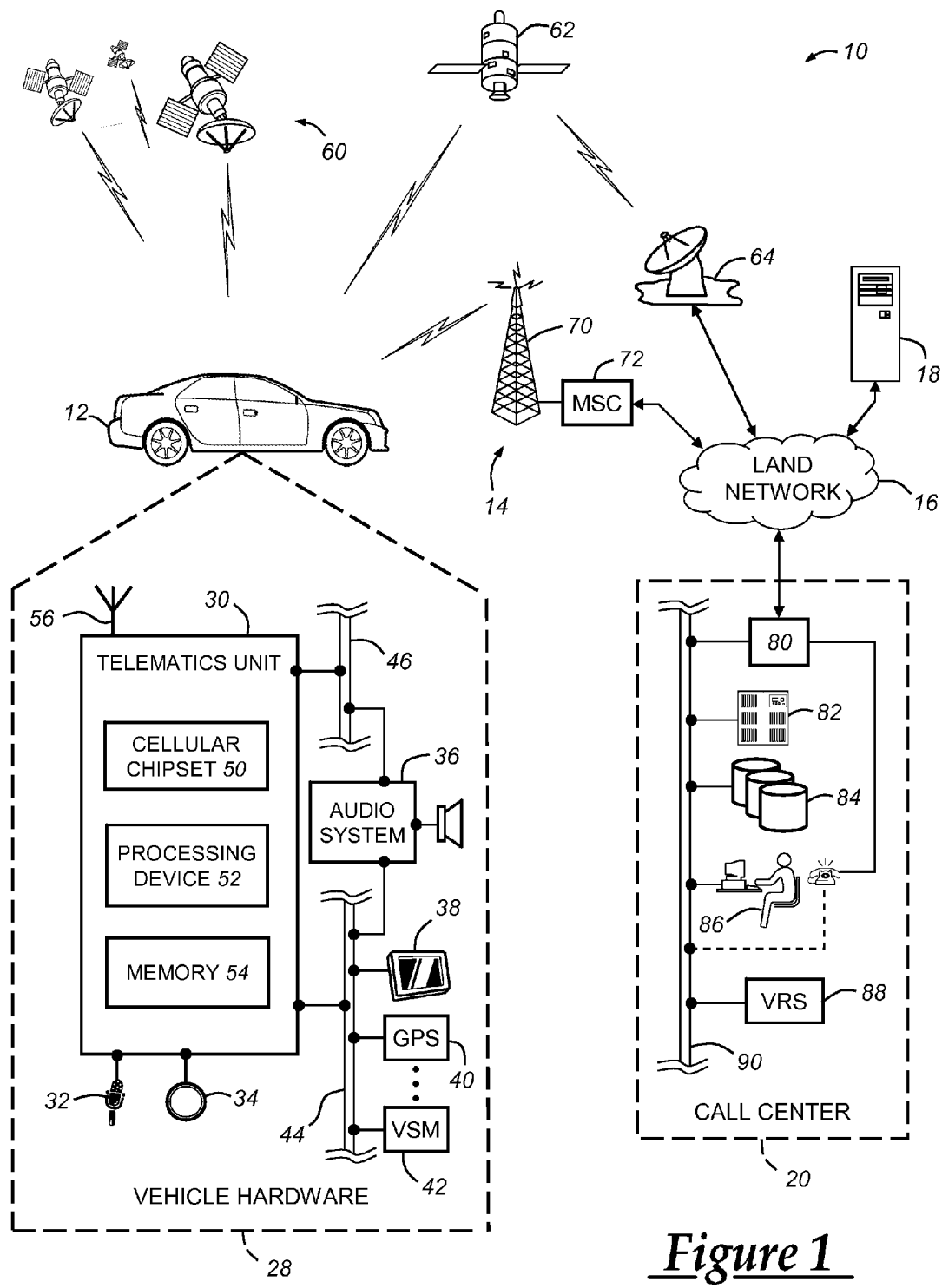
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein. In the preferred embodiment of the invention, the processor 52 communicates with the cellular chipset 50 to compare a telephone number of the call center with the automatic number information (ANI) of the telematics unit 30 to determine whether the differences between the two satisfy a predefined condition which would require the processor 52 to inhibit, mask, replace the location information from the transmission from the telematics unit 30 to the call center 20. The processor 52 may utilize different types of information, discussed subsequently in the Examples set forth below, to identify the predefined condition for which the location information is prevented from transmission.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.
Method—

Figure 2:
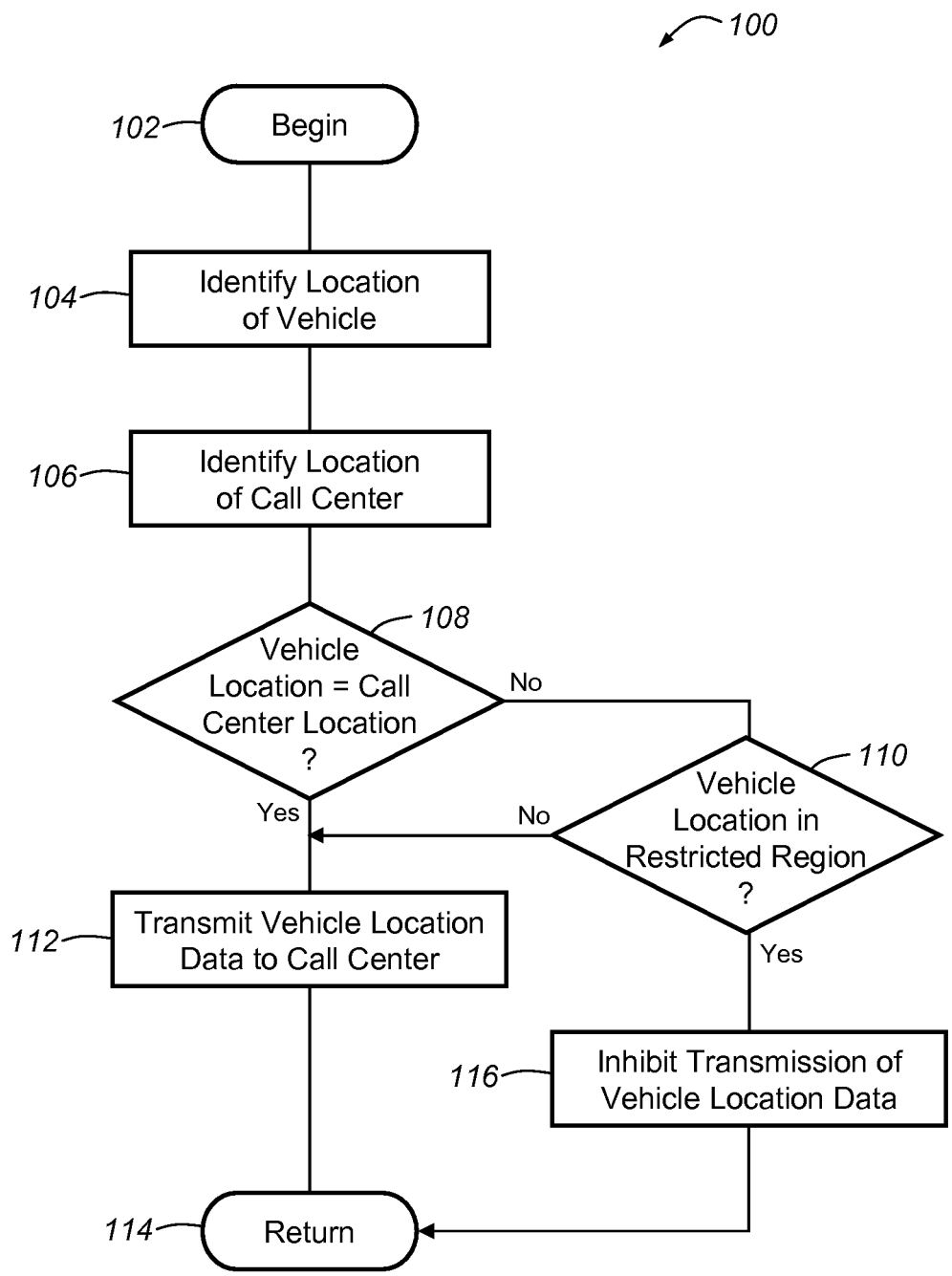
FIG. 2 is a logic chart of an exemplary embodiment of the inventive method.

Turning now to FIG. 2, there is a logic chart of an inventive method generally indicated at 100. The method begins at 102. The location of the vehicle 12 is identified at 104. The identification of the vehicle 12 will be discussed in greater detail subsequently. The location of the call center 20 that the telematics unit 30 is going to be contacting is identified at 106. It is then determined whether the location of the vehicle 12 is equal to the location of the call center 20 at 108. For a location of the vehicle 12 to equal the location of the call center 20, the parameters are set to determine what geographic region in which the vehicle 12 is operating and how large a geographic region in which it is operating is defined. The definition of how large a geographic region is depends on the geographic region. For example, if both the vehicle and call center are within the same geo-political boundary (such as by being within the same country), they can be considered as having the same or equal location. This allows the system to selectively permit or inhibit the transmission of location information based on the relative locations of the vehicle and call center. By way of example, China is a large country that disallows the transmission of vehicle location information to locations outside of the country. Whereas, all of North America allows transmission of such information. To accommodate these different rules, the disclosed system and method can be used to automatically control the inclusion or exclusion of location information in communications transmitted from the vehicle.

Thus, as indicated at step 110, if the vehicle location does not equal the call center location, it is determined whether the vehicle location is in a restricted area (e.g., China versus the United States). If it is not an area that restricts transmission of location information, then the location data of the vehicle 12 is transmitted to the call center 20 at 112.

Likewise, when the vehicle location equals the location of the call center 12 (determined at decision diamond 108), the location data of the vehicle 12 is transmitted to the call center 20 at 112. If the location data is transmitted to the call center, the method returns at 114.

If, however, the vehicle location does not equal the call center location and the vehicle location is identified as a restricted region, the vehicle location data is inhibited from being transmitted to the call center 20 at 116. Once the transmission of the vehicle location data is inhibited at 116, the method returns at 114.

The following examples illustrate methods for determining the relative location of a vehicle 12 with respect to a call center 20. These examples are presented for illustrative purposes only. It should be appreciated by those skilled in the art that other methods for determining the relative location of a vehicle with respect to a call center may be implemented.

Example 1

The inhibiting of the transmission of the location information of a telematics unit at 30 may be accomplished by using the information provided by the GPS module 40 that provides information to the telematics unit 30 through the communications bus 44. If the coordinates provided by the GPS module 40 identify the location of the vehicle 12 to be in a restricted region, the telematics unit 30 then identifies whether the call center 20 is within the restricted region or outside the restricted region. If the call center 20 is within the geographically restricted region, the transmission of the location information by the telematics unit 30 of the vehicle 12 to the call center 20 is permitted. If, however, the call center is outside the restricted region in which the vehicle 12 is located, the location information is inhibited.

Example 2

The telematics unit 30 of the vehicle 12 is equipped with an automatic number identification (ANI). The ANI of the telematics unit 30 generally relates to the geographic region in which the vehicle 12 is operating based on the fact that vehicles are programmed with ANIs when they are sold through a dealership and that those vehicles tend to stay within the geographic region of the dealership. If the ANI of a telematics unit 30 does not match the ANI of a call center 20 to a level of comparison relating to geographic regions or LATAs, the telematics unit 30 may be programmed to inhibit the transmission of the location data from the vehicle 12 to the call center 20.

Example 3

The telematics unit 30 is equipped with an IP address. The IP address is used in conjunction with a web service definition language (WSDL). The IP address may be used for different types of information that are being transmitted between the telematics unit 30 and the call center 20. If the IP address of the telematics unit 30 does not match the IP address of the call center to the level in which the telematics unit 30 may identify that the call center 20 is in a geographic region of the vehicle 12, the telematics unit 30 will inhibit the transmission of the location data to the call center 20.

The location data gathered by the telematics unit 30 and/or the GPS module 40 is formed of a particular syntax and stored in a particular portion of the memory 54. If the telematics unit 30 identifies a situation in which the location data of the vehicle 12 is not to be transmitted to the call center 20, the processing device 52 of the telematics unit 30 can replace the location data stored in memory 54 with data that will be interpreted by the call center 20 as meaningless. The processing device 52 may replace the information with a string of zeros, a string of ones, or any other string of information that will provide no information regarding the actual location of the vehicle 12. For that matter, the replacement of the location data may include a string that can be read by the call center 20 as being "location data restricted." In this way, the call center 20 can determine that the transmission of the location data is actually functioning properly and that an error has not occurred. By incorporating this method into the telematics unit 30, the same vehicle 12 may be sold in any geographic region and comply with the restrictions preventing location of vehicle from being transmitted outside a particular geographic region.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the order of steps 108 and 110 can be reversed. As another example, although the embodiment described above controls the transmission of vehicle location information based on rules or regulations of the region in which the vehicle is located, it will be appreciated that the above discussion is also applicable to other types vehicle information, such as collision data, configuration data, diagnostic data, and other vehicle or user-specific information. Thus, the system and method described herein can be used to inhibit the transmission from the vehicle of a wide variety of different types of data that may be controlled by local or regional laws or regulations. Accordingly, all such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method for inhibiting transmission of location information by a telematics unit of a vehicle to a call center outside a geographic region, the method comprising:
obtaining GPS data gathered by the telematics unit;
obtaining GPS data of the call center;
determining if the vehicle and call center are within the same geo-political boundary based on the GPS data; and
inhibiting the transmission of vehicle location information to the call center if the call center is not within the same geo-political boundary, wherein the inhibiting step further comprises determining whether transmission of location information outside of the geo-political boundary is legally prohibited and, if so, inhibiting the transmission of vehicle location information from the telematics unit to the call center;
wherein the step of inhibiting the transmission of the location information includes the step of replacing the location information with data void of location information.

* * * * *